Nov. 20, 1923.
E. A. PERKINS
SPINDLE
Filed June 10, 1919
1,474,490
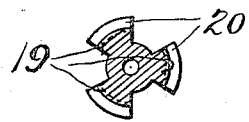
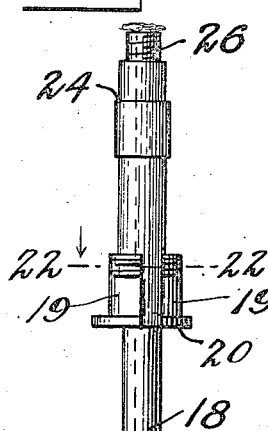
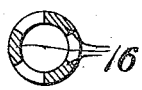
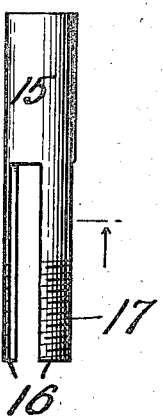
INVENTOR
Edwin A. Perkins
BY
Clarence G. Campbell
ATTORNEY Patented Nov. 20, 1923.

1,474,490

UNITED STATES PATENT OFFICE.

EDWIN A. PERKINS, OF JAMAICA, NEW YORK.

SPINDLE.

Application filed June 10, 1919. Serial No. 303,175.

*To all whom it may concern:*

Be it known that I, EDWIN A. PERKINS, a citizen of the United States, residing at 74 Middletown Street, Jamaica, Long Island, in the county of Queens and State of New York, have invented certain new and useful Improvements in Spindles, of which the following is a specification.

This invention relates to cotton spindles, and more particularly to the self-balancing type of cotton spindle.

The tremendous speed at which cotton spindles are run and the necessary vibration caused largely by such speed, together with the mechanical inaccuracies which necessitate the use of the self-balancing feature, have combined to make it impossible heretofore to make a cotton spindle with ball bearings that would stand the commercial requirements.

My spindle has solved these problems and combines two ball bearings in a self-balancing type of spindle, so that the spindle will do the required work in an efficient manner over a long period of time and with a great saving of power required.

Referring to the drawings Fig. 1 is a sectional view of my spindle. Fig. 2 is a perspective of the center shaft. Fig. 3 is a top plan view of the center shaft. Fig. 4 is a perspective of the bushing which supports the center shaft. Fig. 5 is a top plan view of the bushing.

In the drawing 6 is a base member, which is adapted to be rigidly secured to the rail of the cotton spinning machine, and has an external threading 7 over which a nut 8 is adapted to be screwed for this purpose. The upper end of the base member is cut out to form a cylindrical cup 9, and said cup member has an inturned cylindrical lip 10. There is also an oil filling member 11 on one side of said cup 9, which has a cap member 12 of usual construction. The base member 6 also has an internal longitudinal boring 13 which has an internal threading 14 at its upper end.

A bushing 15 having three longitudinal legs 16 at its lower end, which are externally threaded at 17, is adapted to be screwed into the internal threading 14 to a rigid position. The bushing 15 also has three internal longitudinal flanges 18 which extend the length of the three legs 16.

A center shaft 40 having segmental flanges 19 is adapted to slide into the bushing 15 and the boring 13 of the base member 6, said flanges 19 being adapted to register between the internal longitudinal flanges 18 of the bushing 15.

The segmental flanges 19 have extended flanges 20 on which a ball bearing 21 of usual cage and inner and outer race construction is adapted to rest.

The segmental flanges 19 also have outer threaded portions 22 at their upper ends, over which a nut 23 is adapted to screw the ball bearing 21 in position. The center shaft 40 also has a shoulder 24 near its upper end, on which a second ball bearing 25 of the same construction as 21 is adapted to rest, and the upper end of the center spindle is threaded at 26, over which a nut 27 is adapted to be screwed, thereby holding the ball bearing 25 in position. The center shaft 40 also has a cylindrical boring 28 in which a wick is adapted to be placed.

A whirl 29 is adapted to fit over and rest on the ball bearings 21 and 25, and has a cylindrical lip 30 adapted to effect the closure of the cup 9 in co-operation with the lip 10. The whirl 29 also has a cylindrical face 31 against which the belt of the spinning machine is adapted to contact in order to drive the spindle. The whirl 29 also has an internal cylindrical threading 32 at its upper end, into which a plug 33 having external threading 34 is adapted to be screwed. The plug 33 is bored at 35 so that a blade 36 can be driven therein to make a tight fitting.

As the oil is poured into the filler 11 it will run down into the base of the boring 13, and as it contacts with the wick in the boring 28 will be carried by molecular action to the top of the shaft, whence it will be thrown off by the whirling of the base of the blade 36 contacting against the upper end of the wick and pass through the ball bearing 25 down to the ball bearing 21 on to a baffle plate 37, which has holes therein to permit it to pass through into the cup 9, whence it will pass through the hole 38 into the boring 13. This operation will continue until the oil is used up.

It is seen from the foregoing description that the whirl 29 carrying the blade 36 rotates freely on the ball bearings 21 and 25, and any slight variation from the center by the cylindrical shaft 40 on which the bearings 21 and 25 are carried will be corrected by means of the dashpot formed in the base of the boring 13, which is filled with oil, combined with the fact that the shaft 40 has just enough play between it and the bushing 15 up to the point of close contact with the whirl 29 to permit this.

I claim:—

1. In a spinning spindle a base member having lubricant containing means, a bushing mounted rigidly to said base, a self-balancing bolster mounted in said bushing, a whirl having a blade integral therewith and enlarged head and foot portions mounted on said bolster by means of ball bearings in said head and foot portions, and means for continuously lubricating said bearings.

2. In a spinning spindle a base member having lubricant containing means, a bushing mounted rigidly to said base, a self-balancing bolster mounted in said bushing, a whirl having a blade integral therewith and enlarged head and foot portions mounted on said bolster by means of ball bearings in said head and foot portions, and means for continuously lubricating said bearings comprising a wick channel in said bolster and a wick therein, said blade base forming a flinger running adjacent the upper portion of the wick channel.

3. In a spinning spindle, the combination of a rigidly secured base member having a longitudinal boring, a bushing rigidly secured to said base member supporting a self-balancing cylindrical bolster at its upper end, the lower end of said bolster swinging freely in oil in said boring which acts as a dash-pot, a whirl having enlarged head and foot portions carrying ball bearings therein, supported by said bolster, a blade rigidly secured to said whirl, and means for continuously lubricating said bearings.

4. In a spinning spindle, the combination of a rigidly secured base member having a longitudinal boring, a bushing rigidly secured to said base member supporting a self-balancing cylindrical bolster at its upper end, the lower end of said bolster swinging freely in oil in said boring which acts as a dash-pot, a whirl having ball bearings, carried by said bolster and adapted to support the head and foot portions of said whirl, a blade rigidly secured to said whirl, and means for continuously lubricating said bearings comprising a wick channel in said bolster and a wick therein, said blade base forming a flinger running adjacent the upper portion of the wick channel.

5. In a spinning spindle, the combination of a rigidly secured base member having a longitudinal boring, a bushing rigidly secured to said base member, a self-balancing cylindrical bolster mounted in said bushing so that oil in the boring acts as a dash-pot for said bolster, a whirl supported in enlarged head and foot portions thereof by ball bearings carried by said bolster, a blade rigidly secured to said whirl in combination with means for continuously lubricating said bearings.

6. In a spinning spindle, the combination of a rigidly secured base member having a longitudinal boring, a bushing rigidly secured to said base member, a self-balancing cylindrical bolster mounted in said bushing so that oil in the boring acts as a dash-pot for said bolster, a whirl supported in the head and foot portions thereof by ball bearings carried by said bolster, a blade rigidly secured by said whirl in combination with means for continuously lubricating said bearings, comprising a wick channel in said bolster and a wick therein, said blade base forming a flinger running adjacent the upper portion of the wick channel.

7. In a spinning spindle, the combination with a rotary blade, of a standard supporting the same, an oil reservoir at the bottom of the standard, said standard being provided with a wick channel, and a wick located therein, the lower portion of the blade being formed as a flinger running adjacent the upper portion of the wick channel.

8. In a spinning spindle a base member having lubricant containing means, means for preventing agitation of said lubricant, a bushing mounted rigidly to said base, a self-balancing bolster mounted in said bushing, a whirl having a blade integral therewith and enlarged head and foot portions mounted on said bolster by means of ball bearings in said head and foot portions, and means for continuously lubricating said bearings.

9. In a spinning spindle a base member having lubricant containing means, means for preventing agitation of said lubricant, a bushing mounted rigidly to said base, a self-balancing bolster mounted in said bushing, a whirl having a blade integral therewith and enlarged head and foot portions mounted on said bolster by means of ball bearings in said head and foot portions, and means for continuously lubricating said bearings comprising a wick channel in said bolster and a wick therein, said blade base forming a flinger running adjacent the upper portion of the wick channel.

10. In a spinning spindle, the combination of a rigidly secured base member having a longitudinal boring, a bushing rigidly secured to said base member supporting a self-balancing cylindrical bolster at its upper end, the lower end of said bolster swinging freely in oil in said boring which acts as a dash-pot, a whirl having enlarged head and foot portions carrying ball bearings therein, carried by said bolster and adapted to support the enlarged head and foot portions of said whirl, a blade rigidly secured to said whirl, means for continuously lubricating said bearings, and means for preventing agitation of said lubricant.

11. A spindle, an oscillatably mounted bolster, a socket therefor, a sleeve whirl surrounding said bolster and having diametrically enlarged portions above and below the driving band, ball bearings arranged within said enlarged portions of the whirl, said socket having a lubricant receiving chamber, means for automatically maintaining a continuous circulation of the lubricant between said chamber and the two bearings, and a baffle arranged in said chamber to prevent agitation of the lubricant.

In testimony whereof I affix my signature.

EDWIN A. PERKINS.